United States Patent [19]

Cuscurida et al.

[11] 4,358,547

[45] Nov. 9, 1982

[54] NOVEL CATALYST SYSTEM FOR RIM ELASTOMERS

[75] Inventors: Michael Cuscurida; Richard J. G. Dominquez, both of Austin, Tex.

[73] Assignee: Texaco Inc., White Plains, N.Y.

[21] Appl. No.: 309,963

[22] Filed: Oct. 9, 1981

[51] Int. Cl.³ ............................................. C08G 18/14
[52] U.S. Cl. ..................................... 521/126; 521/127; 528/58
[58] Field of Search .................. 521/126, 127; 528/58

[56] References Cited

U.S. PATENT DOCUMENTS 4,273,885  6/1981  Dominguez et al. ............... 521/115

Primary Examiner—Maurice J. Welsh
Attorney, Agent, or Firm—Carl G. Ries; Jack H. Park; Kenneth R. Priem

[57] ABSTRACT

The invention is a method for making reaction injection molded polyurethane of improved properties. The product comprises the reaction product of a high molecular weight amine based polyol, a low molecular weight active hydrogen containing compound of at least two functionality, a polyisocyanate and suitable additional catalysts. Reaction injection molded elastomers are useful as molded articles of commerce including, but not limited to, vehicle body parts.

8 Claims, No Drawings

NOVEL CATALYST SYSTEM FOR RIM ELASTOMERS

BACKGROUND OF THE INVENTION

1. Field of the Invention

The invention concerns the field of reaction injection molded polyurethanes.

2. Description of the Prior Art

Reaction Injection Molding (RIM) is a technique for the rapid mixing and molding of large, fast curing urethane parts. RIM polyurethane parts are used in a variety of exterior body applications on automobiles where their light weight contributes to energy conservation. RIM parts are generally made by rapidly mixing active hydrogen containing materials with polyisocyanate and placing the mixture into a mold where reaction proceeds. These active hydrogen containing materials comprise a high molecular weight polyhydric polyether and a low molecular weight active hydrogen containing compound. After reaction and demolding, the parts may be subjected to an additional curing step which comprises placing the parts in an ambient temperature of about 250° F. or greater.

In a previously filed patent application, Ser. No. 136,199 filed Apr. 1, 1980, and now U.S. Pat. No. 4,273,885, issued June 16, 1981, a catalyst system for RIM polyurethane elastomers was described which was comprised of dimorpholinodiethylether, dibutyltin dilaurate and an alkyl tin mercaptide. The catalyst combination in that patent application imparts superior processing characteristics to RIM polyurethane elastomer systems. However, we have since discovered that the use of dimorpholinodiethylether, while advantages in many RIM systems, interferes in the cure of certain important paint systems known as high solids enamel paints. Methods for solving this problem are the subject of other patent applications. See, for example, Applications Ser. Nos. 268,460, 268,528 and 268,459 filed on May 29, 1981.

In the present invention we have discovered that the use of a high molecular weight amine based polyol as part of a urethane catalyst combination provides the advantage of not interfering in the urethane network as do reactive amines of low molecular weight. Thus these catalysts do not substantially interfere with the properties of the urethane polymer and do not migrate from the finished urethane product, as is the case for low molecular weight unreactive amine catalysts.

A general discussion of catalysis by soluble polymers is described in *The British Polymer Journal*, 12, 70 (1980) by D. C. Sherrington.

Application Ser. No. 268,220 filed on May 29, 1981 discloses and claims a catalyst comprising polymers containing tertiary amine moieties. We have discovered that the use of amine based polyols in the preparation of RIM elastomers serve also as catalysts for the reaction without releasing harmful amine to the surface. The use of these amine based polyols allows the finished RIM parts to be painted with high solids enamels.

SUMMARY OF THE INVENTION

The invention is a method for making reaction injection molded polyurethane of improved processing characteristics and properties. The product comprises the reaction product of a high molecular weight amine based polyol, a low molecular weight active hydrogen containing compound of at least 2 functionality (a chain extender), a polyisocyanate, a fast gelation organo tin catalyst and a delayed action gelation organo tin catalyst. The invention is also the resulting RIM polyurethane composition.

DESCRIPTION OF THE PREFERRED EMBODIMENTS

The amine based polyols useful in the RIM elastomers of this invention include alkanolamine initiated polyether polyols, having an equivalent weight of at least 500, and preferably at least 1000 up to about 3000. The useful polyether polyols are based, for example, on monoethanolamine, diethanolamine, triethanolamine, monoisopropanolamine, diisopropanolamine, triisopropanolamine and alkanolamines derived from 1-butene oxide. Other suitable amine initiators will be obvious to those skilled in the art and are included in the scope of this invention. The polyethers may be prepared from lower alkylene oxides such as ethylene oxide, propylene oxide, butylene oxide or mixtures of propylene oxide, butylene oxide and/or ethylene oxide. In order to achieve the rapid reaction rates which are normally required for molding RIM polyurethane elastomers, it is preferable that the polyol be capped with enough ethylene oxide to increase the reaction rate of the polyurethane mixture. Normally at least 50% primary hydroxyl is preferred, although amounts of primary hydroxyl less than this are acceptable if the reaction rate is rapid enough to be useful in industrial application. Other high molecular weight polyols which may be useful in this invention are polyesters or hydroxyl terminated rubbers (such as hydroxyl terminated polybutadiene). Hydroxyl terminated quasi-prepolymers of polyols and isocyanates are also useful in this invention. These amine based polyols are also useful when mixed with non-amine containing polyols.

The chain-extenders useful in this invention are preferably difunctional. Mixtures of difunctional and trifunctional chain-extenders are also useful in this invention. The chain-extenders useful in this invention include diols, amino alcohols, diamines or mixtures thereof. Low molecular weight linear diols such as 1,4-butanediol and ethylene glycol have been found suitable for use in this invention. Ethylene glycol is especially preferred. Other chain-extenders including cyclic diols such as 1,4-cyclohexane diol and ring containing diols such as bishydroxyethylhydroquinone, amide or ester containing diols or amino alcohols, aromatic diamines and aliphatic amines would also be suitable as chain-extenders in the practice of this invention.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, napthalene-1,4-diisocyanate, bis(4-isocyanatophenyl)methane, bis(3-methyl-3-isocyantophenyl)methane, bis(3-methyl-4-isocyanatophenyl)methane, and 4,4′-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi-prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

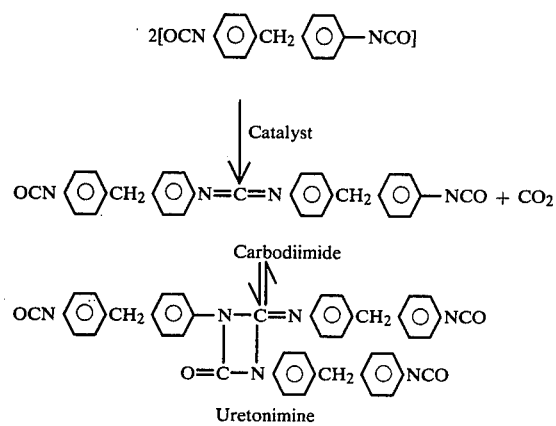

Uretonimine

Examples of commercial materials of this type are Upjohn's ISONATE® 125M (pure MDI) and ISONATE® 143L ("liquid" MDI). Preferably the amount of isocyanates used is the stoichiometric amount based on all the ingredients in the formulation or greater than the stoichiometric amount.

It has been found that an improvement in processing characteristics and paintability using high solids paints of reaction injection molded (RIM) polyurethanes using a combination of ingredients chosen from those enumerated above may be had by employment of a particular catalyst combination in addition to the amine containing polyol. This combination comprises a fast gelation organo tin catalyst and a delayed action gelation organo tin catalyst. A delayed action catalyst begins catalytic activity after a period of time has passed after mixing with the reactants. This particular combination of catalyst types results in valuable processing improvements including excellent flow properties in the mold, a minimum of surface defects due to shrinkage and excellent green strength. This has been difficult to achieve by prior art catalyst systems especially in the high flex modulus elastomers (80,000 psi and above). Although several known tin catalysts may be used in combination to perform the particular function sought here, it is particularly preferred that the combination of the fast gelation tin catalyst, dibutyltin dilaurate and the delayed action gelation tin catalyst, alkyltin mercaptide be used. This alkyltin mercaptide may preferably be a commercial product known as FOMREZ® UL-29. The particular combination of the tin catalysts and the amine based polyol here provides the advantages of processing and green strength and absence of surface flaws which is absolutely necessary to the successful commercialization of RIM parts.

The RIM formulation includes a great number of other recognized ingredients such as additional crosslinkers, catalysts, extenders, blowing agents and the like. Blowing agents may include halogenated low-boiling hydrocarbons, such as trichloromonofluoromethane and methylene chloride, carbon dioxide, nitrogen, etc., used.

Other conventional formulation ingredients may also be employed, such as, for example, foam stabilizers, also known as silicone oils or emulsifiers. The foam stabilizer may be an organic silane or siloxane. For example, compounds may be used having the formula:

$$RSi[O-(R_2SiO)_n-(oxyalkylene)_mR]_3$$

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Although not essential for the practice of this invention, the use of commonly known additives which enhance the color or properties of the polyurethane elastomer may be used as desired. For example, chopped or milled glass fibers, chopped or milled carbon fibers and/or other mineral fibers are useful.

In a preferred embodiment of this invention, a high molecular weight polyether polyurethane polyol of about 5000 molecular weight or above is combined with a stoichiometric excess of 4,4'-diphenylmethane diisocyanate (MDI) and allowed to react in the presence of a catalyst combination of dimorpholinodiethylether, dibutyltin dilaurate and an alkyl mercaptide in a standard RIM machine using known processing techniques. In an especially preferred embodiment of this invention the molded RIM part from just above is postcured at a temperature of about 325° F. for about one half of an hour. The invention may be exemplified by the following examples which are not intended to limit the scope of the invention.

A glossary of terms and materials used in the following examples follows the examples.

EXAMPLE 1

The amino polyols of this invention were prepared using the following three-step procedure:

Step 1

Ten pounds monoethanolamine was charged into a ten-gallon reactor which was then evacuated and purged with pre-purified nitrogen. The reactor was then heated to 90° C. and 19.9 pounds of propylene oxide was added at 90°–96° C. at 38 psig max. After digestion to an equilibrium pressure, the product was stripped to a minimum pressure at 96° C. and drained from the kettle. The finished product had the following properties:

| | |
|---|---|
| Hydroxyl number, mg KOH/g | 930 |
| Water, wt. % | 0.01 |
| Amine content, meq/g | 11.5 |
| pH in 10:6 isopropanol/water | 11.5 |
| Viscosity, 77° F., cs | 3378 |
| 100° F. | 767 |

Step 2

Into a ten-gallon kettle were charged 10 pounds of the product of Step 1 and 998 g 45% aqueous potassium hydroxide. The reactor was then evacuated and purged with prepurified nitrogen. The reactants were then heated to 100° C. and stripped to a minimum pressure. This was followed by nitrogen stripping for one-half hour. Propylene oxide (29.5 lb) was then reacted at 105° C. at 40 psig max. Approximately 1.75 hours were required for addition of the propylene oxide. After digestion to an equilibrium pressure the reaction mixture was stripped to a minimum pressure at 100° C. and drained from the kettle. The product was a light yellow viscous material which had the following properties. The product was sensitive to air and had to be stored under nitrogen to avoid discoloration. The product had the following properties:

| | |
|---|---|
| Alkalinity, mg KOH/g | 24.69 |
| Hydroxyl no, corr. mg KOH/g | 234 |
| Water, wt. % | 0.03 |
| pH in 10:6 isopropanol/water | 13.9 |
| Viscosity, °F., cs | |
| 77 | 2716 |
| 100 | 889 |
| Amine content, meq/g | 1.81 |

Step 3

Into a ten-gallon kettle was charged 5.0 pounds of the product of Step 2. The reactor was then evacuated and purged with prepurified nitrogen. Propylene oxide (31.2 lb) was then added at 105°–110° C. at 50 psig. Approximately 9.0 hours was required for addition of the propylene oxide. After digestion to an equilibrium pressure, the reaction mixture was purged 30 minutes with nitrogen. Ethylene oxide (5.9 lb) was then reacted at 105°–110° C. at 50 psig over a one-half hour period. After digestion to an equilibrium pressure, the product was neutralized at 95° C. with 356 g of 25% oxalic acid. Di-t-butyl-p-cresol (29 g) and Hyflo Supercel were also added at this point. The neutralized product was then stripped to a minimum pressure, nitrogen-stripped and filtered. The finished product was a near-colorless product which had the following properties:

| | |
|---|---|
| Acid no., mg KOH/g | 0.01 |
| Hydroxyl no, mg KOH/g | 31.6 |
| Water, wt. % | 0.02 |
| Unsaturation, meq/g | 0.05 |
| pH in 10:6 isopropanol/water | 9.8 |
| Color, Pt—Co | 15–20 |
| Sodium, ppm | 0.13 |
| Potassium, ppm | 1.28 |
| Peroxide, ppm | 0.15 |
| Viscosity, °F., cs | |
| 77 | 971 |
| 100 | 502 |
| Primary hydroxy, % | 78 |

EXAMPLE 2

This example will illustrate the use of the 31.6 hydroxyl number amino polyol of Example 1 in the preparation of a high flex modulus RIM elastomer (Formulations B, C and D). Formulation A is a standard formulation using a non-amino polyol. Due to differences in postcure temperatures, the elastomers cannot be compared to each other. However, all properties are satisfactory for this type of elastomer. These RIM elastomers were prepared on an Accuratio machine. Formulation, details of preparation and elastomer properties are shown in the following table:

| Formulation, pbw | A | B | C | D |
|---|---|---|---|---|
| Amino polyol[a] | — | 16.0 | 16.0 | 16.0 |
| THANOL SF-5505[b] | 16.0 | — | — | — |
| Ethylene glycol | 6.44 | 6.44 | 6.44 | 6.44 |
| PLURONIC ® F-98[c] | 0.22 | 0.22 | 0.22 | 0.22 |
| THANCAT ® DME[d] | 0.2 | — | — | — |
| FROMREZ ® UL-29[e] | 0.025 | 0.025 | 0.025 | 0.025 |
| Dibutyltin dilaurate[f] | 0.015 | 0.015 | 0.015 | 0.015 |
| P 117 1/16 in type B glass[g] | 17.12 | 17.04 | 17.04 | 17.04 |
| Quasi-prepolymer[h] | 5.84 | 5.83 | 5.83 | 5.83 |
| ISONATE ® 243L[i] | 30.23 | 30.18 | 30.18 | 30.18 |
| Isocyanate index | 31.04 | 1.04 | 1.04 | 1.04 |
| Details of Preparation | | | | |
| Postcure, °F. | 310 | 325 | 250 | No postcure |
| Properties | | | | |
| Shore D hardness | 81/79 | 72/68 | 71/66 | 69/66 |
| Tensile, psi (ASTM D-412) | 4774 | 4407 | 4373 | 3913 |
| Ultimate elongation, % (ASTM D-412) | 41.7 | 37 | 32 | 23 |
| Flexural modulus, psi ×10³ (ASTM D-790) | | | | |
| Room temperature | 228.7 | 235.9 | 257.7 | 226.4 |
| 158° F. | 180.6 | 205.1 | 190.2 | 163.9 |
| −20° F. | 381.3 | 398.7 | 442.9 | 437.1 |
| 325° F. | 69.8 | 95.4 | 82.3 | 88.6 |
| Flexural modulus ratio (−20° F./158° F.) | 2.1 | 1.94 | 2.3 | 2.67 |
| Heat sag | | | | |
| 1 hr at 250° F., 4″ overhang, in | 0.06 | 0.03 | 0.037 | 0.104 |
| ½ hr at 325° F., 6″ overhang, in | 0.30 | 0.185 | 0.82 | 1.5 |
| Izod impact, ft/lb/in (ASTM D-256) | 4.2 | 5.0 | 3.85 | 4.90 |

[a]Amino polyol from step 3, Example 1; hydroxyl no, mg KOH/g = 31.6
[b]5500 m.w. PO/EO adduct of glycerin; Texaco Chemical Co.
[c]11,000 m.w. 80/20 EO/PO diol; BASF Wyandotte
[d]Dimethylaminoethanol; Texaco Chemical Co.
[e]Thioorganotin Compound; Witco Chemical Co.
[f]SUL-4; Witco Chemical Co.
[g]Owens-Corning Fiberglas
[h]Isocyanate with quasi-prepolymer THANATE ® L-55-0; Texaco Chemical Co.
[i]Liquid MDI; Upjohn Chemical Co.

EXAMPLE 3

This example will illustrate the preparation of the 5500 molecular weight propylene oxide/ethylene oxide adduct of triethanolamine (TEA) which was used in this invention. This TEA-based polyol was prepared in a two-step procedure which utilized the two mole propylene oxide adduct of TEA (THANOL SF-265) as the initiator. The THANOL SF-265 was first propoxylated to prepare a 700 molecular weight precatalyzed initiator. The 5500 molecular weight polyol was subsequently prepared from this initiator. Details for preparation of the initiator and polyol are as follows:

Preparation of Initiator for Amino Polyol

Into a ten-gallon kettle was charged 15 pounds of THANOL SF-265 and 816 g of 45% aqueous potassium hydroxide. The reactor was then evacuated and purged with prepurified nitrogen. The initiator was then heated to 100° C. and vacuum stripped to a water content of 0.15–0.25%. Propylene oxide (24.6 pounds) was then reacted at 105° C. at 25 psig. Approximately one hour was required for addition of the propylene oxide. After a two-hour digestion, the product was purged with nitrogen while being cooled to 25° C. The initiator was stored in a nitrogen padded container. The finished initiator has the following properties:

| | |
|---|---|
| Alkalinity, mg KOH/g | 19.5 |
| Hydroxyl number, corr., mg KOH/g | 239.5 |
| Water, wt. % | 0.01 |
| Viscosity, °F., cs | |
| 77 | 1014 |
| 100 | 383 |

Preparation of 5500 Molecular Weight Amino Polyol

Ten pounds of the precatalyzed TEA-based initiator (alkalinity, mg KOH/g 19.5; hydroxyl number, corr., mg KOH/g 239.5) was charged to a ten-gallon kettle which was then evacuated and purged with prepurified nitrogen. Maintaining a nitrogen purge the initiator was heated to 100° C. Propylene oxide (62.4 pounds) was then reacted at 105°–110° C. at 50 psig. Approximately 10 hours was required for addition of the propylene oxide. The reaction mixture was then digested to a minimum pressure and stripped with nitrogen for 30 minutes. Ethylene oxide (11.8 pounds) was then reacted at 105°–110° C. over a one-hour period and the reaction mixture digested to an equilibrium pressure. The alkaline product was then neutralized with oxalic acid dihydrate (141.5 g dissolved in 424.5 g water). No pH check was required due to the basicity of the polyol. Di-t-butyl-p-cresol (57.3 g) and Hyflo Supercel (150 g) were added to the neutralized polyol. Finally, the neutralized product was vacuum stripped to a minimum pressure, nitrogen stripped, and filtered. The finished product had the following properties:

| | |
|---|---|
| Amine content, meq/g | 0.17 |
| Hydroxyl number, mg KOH/g | 31.2 |
| Water, wt. % | 0.01 |
| pH in 10:6 isopropanol-water | 9.4 |
| Color, Pt—Co | 30–40 |
| Sodium, ppm | 0.6 |
| Potassium, ppm | 0.7 |
| Peroxide, ppm | 0.3 |
| Viscosity, °F., cs | |
| 77 | 939 |
| 100 | 480 |
| Primary hydroxy, % | 79 |

EXAMPLE 4

This example will illustrate the use of the amino polyol of Example 3 in the preparation of high flexural modulus RIM elastomers. Example 6 will show the improved thermal properties (heat sag) of elastomers made from the amine initiated polyol of Example 3 compared to elastomers made from a standard 5,000 molecular weight glycerine initiated triol (THANOL SF-5505) typically used for this application (see Example 6).

The polyol of Example 3, a triethanolamine initiated analogue of THANOL SF-5505, 16.0 pbw; THANOL C-64, 6.66 pbw; FOMREZ UL-29 delayed action tin catalyst, 0.025 pbw; dibutyltin dilaurate fast gelation tin catalyst, 0.015 pbw and Owens-Corning Fiberglass P-117B 1/16" milled glass fibers, 14.56 pbw were charged with the B-component working tank of an Accuratio VR-100 reaction injection molding machine. ISONATE 143L, 29.78 pbw and quasi-prepolymer THANATE L-55-0, 5.77 pbw were charged into the A-component working tank. The B-component temperature was adjusted to 115° F. and impingement pressured to 2040 psi; the A-component temperature was adjusted to 85° F. and impingement pressured to 2240 psi. Flat plaques were molded in a steel tool measuring 18"×18"×⅛" at 150° F. The resulting plaques were tested for properties which are shown in Table I. The material contains 20% by weight glass and has an isocyanate index of 1.04.

EXAMPLE 5

The same type of RIM part of Example 4 was molded with the only difference being that THANOL SF-5505 was used as the polyol and dimethylethanolamine 0.1 pbw was used as the amine catalyst.

EXAMPLE 6

As can be seen from the data in Table I, the properties of the elastomers of Examples 4 and 5 are essentially equivalent with the exception that the heat sag of the elastomer of Example 4 is better (lower value) than that of the elastomer of Example 5. Also, the paintability of both elastomers is equivalent with respect to "high solids" enamel paints such as the PPG-430 paint system. When a nonreactive amine catalyst such as THANCAT DMDEE is used in the same elastomer formulation the material fails in paintability when tested with the PPG-430 "high solids" enamel paint system. Also, the elastomer of Example 2 painted in an equivalent manner to that of Example 4.

TABLE I
PROPERTIES OF RIM MATERIALS
POSTCURED 30 MINUTES AT 155° C. (310° F.)

| | Materials | | | |
|---|---|---|---|---|
| | Example 4 | | Example 5 | |
| Sample orientation relative to flow direction | 11 | 1 | 11 | 1 |
| Tensile, psi | 4575 | 4095 | 4710 | 4245 |
| Ultimate elongation, % | 52 | 62 | 45 | 62 |
| Izod impact, ft/lb/in | 4.8 | 4.8 | 4.6 | 4.8 |

TABLE I-continued
PROPERTIES OF RIM MATERIALS
POSTCURED 30 MINUTES AT 155° C. (310° F.)

| Materials | Example 4 | | Example 5 | |
|---|---|---|---|---|
| Heat sag, mm 150 mm overhang 30 min. at 155° C. | 2.6 | 6.1 | 5.1 | 11.5 |
| Flexural modulus, psi measured at room temp. | 245,000 | 162,000 | 276,000 | 173,000 |
| 158° F. | 190,000 | 109,000 | 198,000 | 104,000 |
| −20° F. | 404,000 | 286,000 | 431,000 | 293,000 |
| 311° F. | 90,000 | 42,000 | 86,000 | 36,000 |

GLOSSARY OF TERMS AND MATERIALS

RIM—Reaction Injection Molding

Polyol—A di- or greater functionality high molecular weight alcohol terminated molecule composed of ether groups such as ethylene, propylene, butylene, etc., oxides.

MDI—4,4' diphenyl methane diisocyanate ISONATE 143L—Pure MDI isocyanate modified so that it is a liquid at temperatures where MDI crystallizes—product of the Upjohn Co.

PAPI 901—A crude form of MDI containing about 30% higher functionality isocyanates and other impurities—product of the Upjohn Co.

Quasi-prepolymer L-55-0—A quasi-prepolymer formed by reacting equal weights of ISONATE 143L and THANOL SF-5505.

Quasi-prepolymer P-55-0—A quasi-prepolymer formed by reacting equal weights of PAPI 901 and THANOL SF-5505.

THANOL SF-5505—a 5500 molecular weight polyether triol containing approximately 80% primary hydroxyl groups.

L5430 Silicone Oil—A silicone glycol co-polymer surfactant containing reactive hydroxyl groups. Product of Union Carbide.

THANCAT DMDEE—Dimorpholinodiethylether
THANCAT DME—Dimethylethanolamine

FOMREZ UL-29—A stannic diester of a thiol acid (an alkyl tin mercaptide). The exact composition is unknown. Product of Witco Chemical Co.

THANOL C64—A mixture of ethylene glycol and an emulsifier comprising an ethylene oxide/propylene oxide diol having an average molecular weight of about 12,000. Described in U.S. Pat. No. 4,273,884.

THANOL SF-265—Two mole propylene oxide adduct of triethanolamine.

We claim:

1. In a method for making a RIM polyurethane elastomer of significantly improved properties wherein an aromatic polyisocyanate, a polyol of above about 500 equivalent weight, a chain extending agent comprising a low molecular weight active hydrogen containing compound of at least 2 functionality, a fast gelation organo tin catalyst and a delayed action gelation organo tin catalyst are injected via a RIM machine into a mold cavity of the desired configuration the improvement which comprises using as the polyol an amine based polyol of at least 500 equivalent weight.

2. A method as in claim 1 wherein the amine based polyol comprises a polyether based on an alkanolamine.

3. A method as in claim 1 wherein the polyisocyanate comprises 4,4'diphenylmethane diisocyanate.

4. A method as in claim 1 wherein the elastomer is postcured at about 325° F.

5. In a method for making RIM polyurethane elastomer of significantly improved properties wherein an aromatic polyisocyanate, a polyol of above about 500 equivalent weight, a chain extending agent comprising a low molecular weight active hydrogen containing compound of at least 2 functionality, a fast gelation organo tin catalyst and a delayed action gelation organo tin catalyst are injected via a RIM machine into a mold cavity of the desired configuration the improvement which comprises using as the polyol based on triethanolamine of at least 500 equivalent weight.

6. A method as in claim 5 wherein the polyol had a hydroxyl number of about 31.

7. A method as in claim 5 wherein the polyisocyanate comprises 4,4' diphenylmethane diisocyanate.

8. A method as in claim 5 wherein the elastomer is postcured at about 325° F.

* * * * *